(12) United States Patent
Kindem

(10) Patent No.: US 7,732,780 B2
(45) Date of Patent: Jun. 8, 2010

(54) COMBINED COLD PLATE AND RADIATION SHIELD

(75) Inventor: Joel Kindem, San Diego, CA (US)

(73) Assignee: Digirad Corporation, Poway, CA (US)

( * ) Notice: Subject to any disclaimer, the term of this patent is extended or adjusted under 35 U.S.C. 154(b) by 97 days.

(21) Appl. No.: 11/752,126

(22) Filed: May 22, 2007

(65) Prior Publication Data

US 2007/0267577 A1    Nov. 22, 2007

Related U.S. Application Data

(60) Provisional application No. 60/747,911, filed on May 22, 2006, provisional application No. 60/808,013, filed on May 23, 2006.

(51) Int. Cl.
*G01T 1/24* (2006.01)
(52) U.S. Cl. ................................. 250/370.15
(58) Field of Classification Search ............. 250/370.15
See application file for complete search history.

(56) References Cited

U.S. PATENT DOCUMENTS

| 6,548,815 | B1 * | 4/2003 | Umazaki ............... | 250/370.09 |
|---|---|---|---|---|
| 6,713,769 | B2 * | 3/2004 | Vafi et al. ............... | 250/370.15 |
| 6,927,379 | B2 * | 8/2005 | Hoffman ................. | 250/208.1 |
| 7,019,783 | B2 | 3/2006 | Kindem et al. | |
| 7,164,130 | B2 | 1/2007 | Welsh et al. | |
| 2004/0075059 | A1 * | 4/2004 | Serebryanov et al. .. | 250/370.15 |
| 2004/0173750 | A1 | 9/2004 | Welsh et al. | |
| 2004/0211908 | A1 * | 10/2004 | Sato et al. .............. | 250/370.09 |
| 2005/0067573 | A1 * | 3/2005 | Albert et al. ........... | 250/370.01 |
| 2005/0104000 | A1 | 5/2005 | Kindem et al. | |
| 2005/0157193 | A1 | 7/2005 | Kindem et al. | |
| 2006/0227230 | A1 | 10/2006 | Kindem et al. | |
| 2007/0092144 | A1 | 4/2007 | Bai et al. | |
| 2007/0111343 | A1 | 5/2007 | Kindem et al. | |

* cited by examiner

*Primary Examiner*—Constantine Hannaher
(74) *Attorney, Agent, or Firm*—Law Office of Scott C. Harris

(57) ABSTRACT

A combined cold plate for RF shield is optimized both for cooling a device and also for shielding it against RF. One embodiment uses a two-part material so that it has improved thermal characteristics from one part and RF shielding characteristics from another part.

25 Claims, 2 Drawing Sheets

COMBINED COLD PLATE AND RADIATION SHIELD

CROSS-REFERENCE TO RELATED APPLICATIONS

This application claims priority to U.S. Provisional Application 60/747,911, filed May 22, 2006 and U.S. Provisional Application 60/808,013, filed May 23, 2006. The disclosure of the prior applications are considered part of (and are incorporated by reference in) the disclosure of this application.

BACKGROUND

A radiation imaging system may detect and image radiation that has interacted with a body, e.g., a human body in some way. Different kinds of radiation imaging systems are known, including systems that produce an image indicative of radiation that has been transmitted through an object, and other systems that detect radiation that is emitted from an object.

An image of the distribution of radiation absorption is obtained. That image represents information about the inside of a body that has absorbed radiation. A typical tactic may focus the radiation e.g. through a collimator array; use the radiation to induce a scintillator to emit light based on the radiation (e.g. gamma ray) particles which are received, and use a photoreceptor, e.g. photodiodes, to sense the emitted light and produce electrical signals indicative thereof.

Very often, the intensity of the radiation may be very low, and the signal-to-noise ratio becomes extremely important.

SUMMARY

The present application teaches a combined cold plate and shield.

According to embodiments, the shield can be a radiation shield and/or a radio frequency ("RF") and/or electromagnetic interference ("EMI") filter.

Embodiments describe using a single material, and/or a combination of different materials as the device.

BRIEF DESCRIPTION OF THE DRAWINGS

The drawings show different aspects of this system, where.

DETAILED DESCRIPTION

Figure 1:
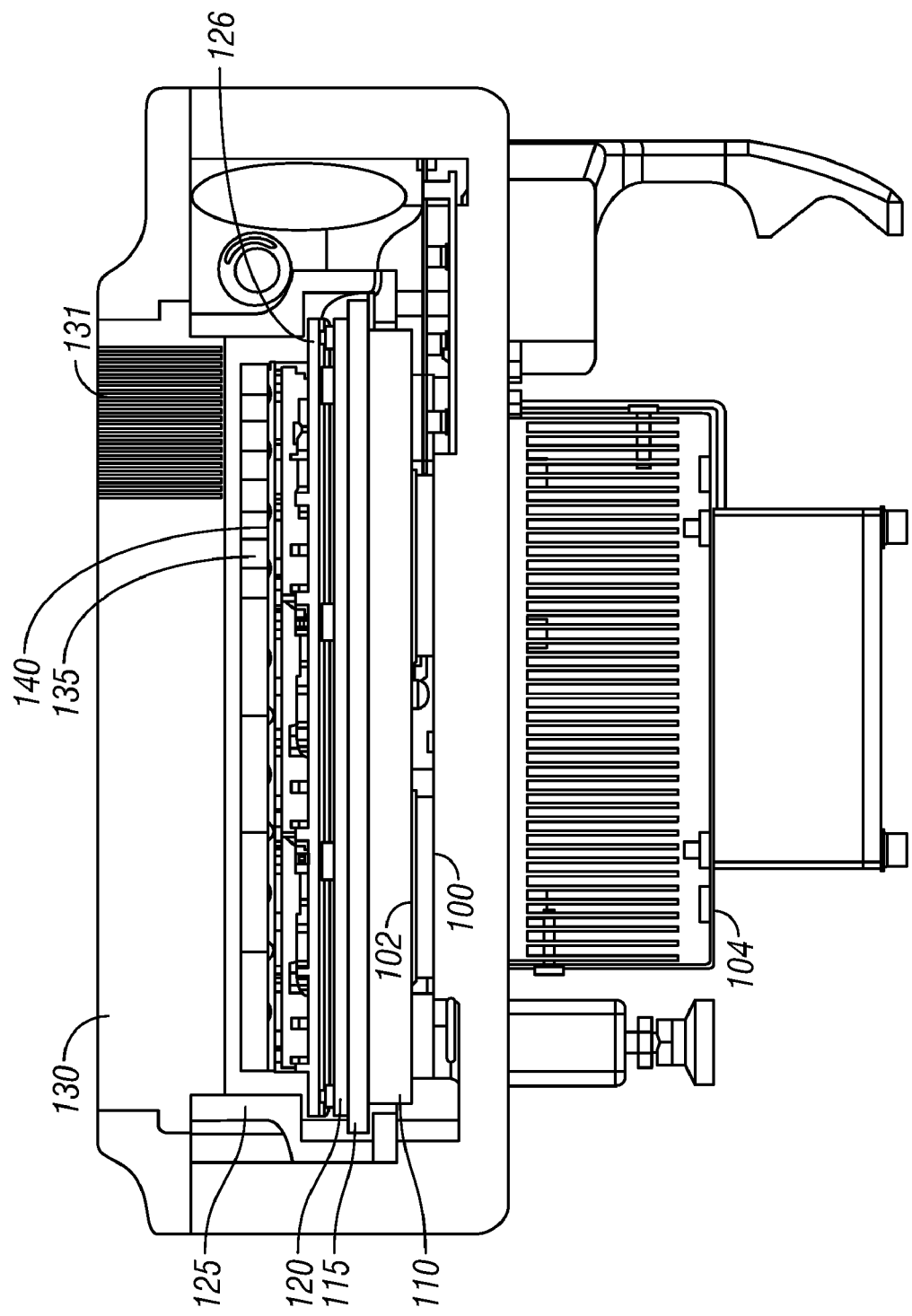
FIG. 1 shows a view of an embodiment.

FIG. 1 shows an embodiment of a camera head including the techniques of combining a cold plate with an interference shield, where the interference being shielded can be radiation, RF and/or EMI. This can be used in any detector, and most specifically, can be used in a detector that detects high energy photons such as x-rays or gamma rays.

Signal-to-noise ratio of medical imaging cameras is very important. However, these devices also need to be cooled. When a device like this is cooled, there needs to be a cooling connection to the camera. The connection can be electrical, in case of a thermoelectric cooler, or can be a pipe.

The connection to the camera leaves a hole in the shielding. That hole often causes an unshielded part, or requires a 'shadow shield'.

The embodiment shields the receiving circuitry, e.g. the scintillators and photodiodes, to the extent practical, against interference. The interference can be RF and/or EMI interference; e.g. there are substantial RF interference sources in the 60 Hz range, as well as at other RF frequencies. For example, other bands which have large amounts of RF interference may include the television and radio bands, the cellular telephone bands, as well as the 900 MHz and the 2.4 GHz range bands which are used for personal communication.

In addition, however, this device is very often used in a gamma ray environment, and it may be desirable to isolate against other radiation such as gamma rays and x-rays. This embodiment recognizes the importance of isolating the receivers from this radiation while maintaining the cooling.

In addition, the structure which carries out the optical detection produces substantial amounts of heat. Keeping that structure cold may also increase the signal-to-noise ratio.

In an embodiment, a cooler is provided, which forms a cold plate which is used to cool the electronic circuitry. The cold plate may be used to spread the cold temperature, in order to avoid hot spots and to provide an even cooling effect. According to this system, a combined interference shield and cold plate is provided.

The embodiment recognizes that the metal which has the best protection against radiation, however, is often not the best cooling material.

A cold plate is described which is formed of two or more separate materials. A first material may be any kind of material with good thermal conductivity. The application describes using aluminum as the first material. However, the first material could be any other material with good thermal conductivity, such as copper, tin, iron or a mixtures thereof.

A second material is a good radiation shielding material, here lead, bismuth, tungsten or molybdenum. Any shielding material or composition can be used that has pronounced absorption/attenuation of x/gamma-ray photons, specifically, a material with an absorption/attenuation coefficient >90 (in units of 1/cm), for 30 keV photons.

The two materials are bound together to form a thermal sandwich. The thermal sandwich of radiation protecting material completely encases around the medical imaging detecting head. The materials are also used to deliver cooling.

A thermoelectric cooler device is shown in FIG. 1 as element 100. The thermoelectric cooler uses the so-called Peltier principle, and has a cold side 102, and an opposite hot side. The hot side is in contact with a heat sink and fan shown generally as 104. The cold side of the Peltier cooler is thermally connected to the first high-Z material 110, here shown as aluminum. This can be any metal, preferably high-Z with a good thermal conductivity. This thermal characteristic allows spreading the cold, and hence forms the cold plate.

Other cold plates can be used, including refrigeration based cold plates, or chilled water or coolant, or any other cooling technique.

A radiation shield material 115 is thermally coupled to the first material 110, and a second, high-Z material 120 covers the top portion of the radiation detector material 115.

Another embodiment may use a three part "sandwich" of aluminum/lead/aluminum (or other comparable materials). Aluminum is relatively cheap, and hence may reduce costs in forming the cooling part material. However, if higher thermal conductivity materials such as tungsten or a tungsten composite is used, then the cold plate might only need one part.

The sandwich embodiments may use pieces which have similar thicknesses, or different thicknesses. In one embodiment, the thickness of the lead portion is double the thickness of each aluminum portion.

Other lead shield portions are also formed completely surrounding the camera. A lead side piece 125 forms a second shield part that is formed in a different location than the first shield part—surrounding the side of the camera, shielding against incoming radiation from the side. A lead top piece 130 is formed. The lead may be used for collimation, to allow only radiation that is impinging at the proper angle to enter the camera head.

According to another embodiment, a single layer of material is used instead of the sandwich of multiple materials. This requires a material to be used that is both an excellent thermal conductor, and an excellent radiation shield. Tungsten could be used as such a material. However, the expense of tungsten may be mitigated against use of the single layer embodiment. Materials other than tungsten may also be used.

The active elements of the camera are located inside the radiation shield formed by pieces 115, 125, and 130. The collimator holes 131 allow desired radiation to be coupled to a scintillator 135, which converts the radiation received to light photons that are detected by photodiodes 140. An optical epoxy may be used to hold the photodiodes 140 on to the scintillators 135, which may be, for example, cesium iodide scintillators. The output of the photodiodes 140 form the electrical output indicating the medical image.

The top of the cold plate 125 is also in contact with heat distributing material 126. The material 126, including parts shown in in FIG. 1 is formed of that heat distributing material, which may be aluminum.

Figure 2:
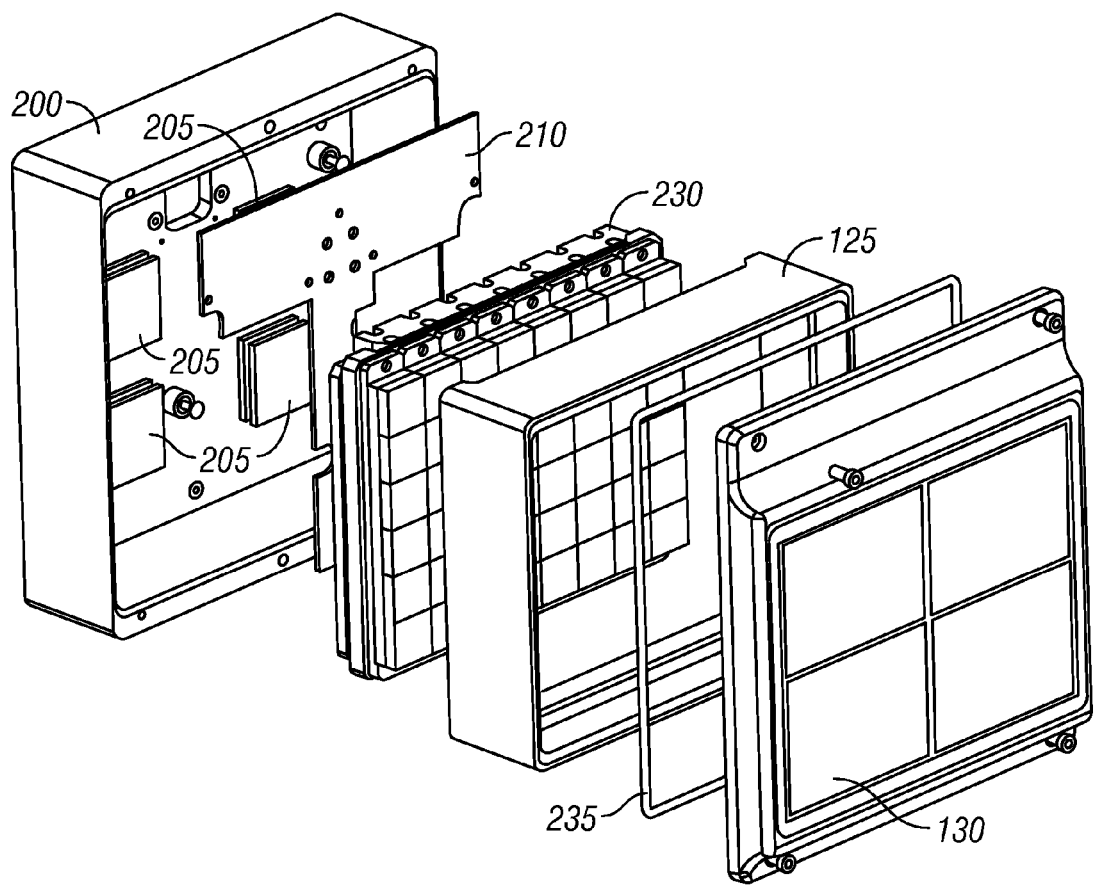
FIG. 2 shows an exploded view of the device as part of a complete imaging head.

FIG. 2 shows an exploded view of the camera head. A head shell 200 forms the outer portion within which the thermoelectric coolers 205 are located. A circuit board 210 may hold the circuitry that carries out the processing. The cold plate 230 is formed of the multiple metal sandwich 110/115/120, as described above. The cold plate carries out the function of both cooling the electronics and also radiation shielding. The lead side shields 125 are also shown in FIG. 2, with an EMI gasket 235 attaching to the collimator 130.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other metals, and other numbers of metals forming multiple layer units, may be used.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

The images obtained from the camera may be directed displayed, or may be processed by an image processing computer. That computer may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, BREW or any other programming language. The programs may be resident on a storage medium, e.g., magnetic or optical, e.g. the computer hard drive, a removeable disk or media such as a memory stick or SD media, or other removeable medium. The programs may also be run over a network, for example, with a server or other machine sending signals to the local machine, which allows the local machine to carry out the operations described herein.

What is claimed is:

1. A shield for a high energy photon detector, comprising:
   a first shield part, in contact with a high energy photon detector, and carrying out both radiation shielding and electrical cooling;
   said first shield part including a cooling part, in contact with said detector and formed of a material that is optimized for heat transfer, said first part being only in a first location;
   and at least one second shield part, carrying out radiation shielding, in a different location than said first shield part, said second shield part in a location that shields said detector against radiation, said second shield part having a material that is optimized for radiation shielding characteristics,
   said first and second shield parts formed of different materials and wherein there is at least one location that is covered only by said first shield part in said first location and is not covered by said second shield part.

2. A shield as in claim 1, wherein said first shield part includes aluminum.

3. A shield as in claim 1, wherein said first shield part includes lead.

4. A shield as in claim 1, wherein said first shield part and said second shield part are connected one over the other, to form a two layer shield having both said first shield part and said second shield part forming a sandwich over at least a portion thereof.

5. A shield as in claim 1, wherein said second shield part surrounds a perimeter of said detector.

6. A shield as in claim 5, further comprising a third shield part, that covers at least a portion of said photon detector that is not covered by said first and second shield parts.

7. A shield as in claim 1, wherein said first shield part is formed of first, second and third materials, each extending continuously over a same area, wherein said first and third materials have temperature conductive optimized characteristics, and the second material is optimized for radiation shielding, said second layer between said first and third materials.

8. A shield as in claim 7, wherein said first and third shield parts are formed of aluminum.

9. A shield as in claim 7, wherein said second shield part is formed of lead.

10. A shield as in claim 1, wherein said cooling part includes a heatsink.

11. A shield as in claim 10, wherein said cooling part includes a fan.

12. A shield as in claim 10, wherein said cooling part includes an active thermoelectric cooler.

13. A shield as in claim 1, wherein said cooling part includes a cold plate.

14. A camera system, comprising: detector electronics, optimized for detecting incoming high energy photons; a cooling part and radiation shield, coupled to said detector electronics, wherein the same structure carries out both cooling and radiation shielding, said cooling part and radiation shield including a cold plate which is actively cooled and is formed of a first material optimized for heat conduction; a second shield part, surrounding a perimeter of said detector electronics; and formed of a material optimized for a radiation shield and different than said first material; and a third shield part, which shields at least another portion of said detector electronics, and allows only certain portions of radiation to pass therethrough, the portions of radiation which passed therethrough being sent to said detector electronics, said first and second materials being different materials and wherein there is at least one location that is covered only by said first material and not by said second material.

15. A system as in claim 14, wherein said cooling part and radiation shield is formed from a single piece of material that has both thermal conductivity characteristics and radiation shielding characteristics.

16. A system as in claim 14, wherein said cooling part and radiation shield is formed from three pieces of material which each extend along the same area, and are coupled together, at least one of said materials including a material that is optimized for radiation shielding characteristics and at least another of said materials being optimized for thermal conductivity characteristics.

17. A system as in claim 14, wherein said cooling part includes a heatsink.

18. A system as in claim 14, wherein said cooling part includes a thermoelectric cooler.

19. A system as in claim 14, wherein said cold plate includes a connection to cooled coolant.

20. A system as in claim 14, wherein said cooling part and radiation shield is formed without any holes therein.

21. A method of obtaining a medical image, comprising: using the same structure to both shield against radiation using a first part that is formed of radiation shield material and having a second part that is formed of thermal transfer material to actively cool a detector element of a gamma ray camera, said first and second parts formed of different materials; and using said detector element to detect gamma rays.

22. A method as in claim 21, wherein said structure is a three art structure including a first part with thermal characteristics and a second part with RF shielding characteristics.

23. A method as in claim 21, further comprising shielding a surrounding area of said detector element by surrounding a perimeter of said detector element with a second shield part that has radiation shielding characteristics.

24. A method as in claim 23, further comprising shielding a third part of the detector element using a shield with collimator holes therein.

25. A method as in claim 21, wherein said using the same structure to both shield against radiation comprises using a structure that has no holes therein.

* * * * *